United States Patent

Okada et al.

[11] Patent Number: 5,908,688
[45] Date of Patent: Jun. 1, 1999

[54] ANTISTATIC POLYESTER FILM

[75] Inventors: Shinichiro Okada; Toshifumi Ishikawa; Masayuki Fukuda, all of Sagamihara, Japan

[73] Assignee: Teijin Limited, Osaka, Japan

[21] Appl. No.: 08/717,179

[22] Filed: Sep. 20, 1996

[30] Foreign Application Priority Data

Sep. 20, 1995 [JP] Japan ................................ 7-241502

[51] Int. Cl.$^6$ ................ B32B 27/08; B32B 27/18; B32B 27/36; C08K 5/521
[52] U.S. Cl. ................ 428/216; 428/323; 428/336; 428/480; 428/483; 428/910; 427/372.2; 427/412.5; 264/289.3; 430/529; 524/127
[58] Field of Search .................. 428/480, 910, 428/483, 323, 141, 694 BR, 694 SG, 215, 216, 336; 524/115, 127; 430/533, 531, 536, 529; 427/372.2, 412.5; 264/289.3

[56] References Cited

U.S. PATENT DOCUMENTS

| | | | |
|---|---|---|---|
| 3,658,573 | 4/1972 | Guestaux et al. | 117/76 P |
| 3,997,701 | 12/1976 | Ealding et al. | 428/341 |
| 4,038,258 | 7/1977 | Singh et al. | 260/75 T |
| 4,082,887 | 4/1978 | Coates | 428/289 |
| 4,115,334 | 9/1978 | Gerow | 260/28.5 D |
| 4,287,298 | 9/1981 | Dodwell | 430/533 |
| 4,876,155 | 10/1989 | Thoese et al. | 428/480 |
| 4,943,510 | 7/1990 | Thoese et al. | 430/160 |
| 5,334,679 | 8/1994 | Yamamoto et al. | 526/200 |

FOREIGN PATENT DOCUMENTS

| | | |
|---|---|---|
| 1-49114 | 10/1989 | Japan . |
| 6255055 | 9/1994 | Japan . |
| 7156357 | 6/1995 | Japan . |

OTHER PUBLICATIONS

Abstract of Japanese Pat. Publ. No. 47–040 600 B (1972).
Abstract of Japanese Laid–Open Pat. Appl. Publ. No. 7–156357 A (Jun. 20, 1995).
Abstract of Japanese Laid–Open Pat. Appl. Publ. No. 8–169096 A (Jul. 2, 1996).
Abstract of Japanese Laid–Open Pat. Appl. Publ. No. 61–285232 A (Dec. 16, 1986).

*Primary Examiner*—Vivian Chen
*Attorney, Agent, or Firm*—Sherman and Shalloway

[57] ABSTRACT

An antistatic polyester film having formed on at least one side of a polyester film a coating layer which consists essentially of (a) 5 to 40% by weight of a phosphoric acid ester salt-based antistatic agent, (b) 1 to 20% by weight of a surfactant having an HLB value of 12 or less, (c) 40 to 90% by weight of at least one binder selected from acrylic copolymers and polyester copolymers, and (d) 3 to 25% by weight of fine particles having an average particle diameter of 10 to 500 nm and which has an extremely uniform surface. This film is excellent in anti-blocking properties at a high humidity and antistatic properties at a low humidity.

11 Claims, No Drawings

ANTISTATIC POLYESTER FILM

FIELD OF THE INVENTION

This invention relates to an antistatic polyester film and, more specifically, to an antistatic polyester film having excellent coating appearance, transparency, adhesion, anti-blocking properties at a high humidity and antistatic properties at a low humidity.

PRIOR ART

Since a biaxially oriented polyester film has dominant features excellent transparency, dimensional stability, mechanical properties, electrical properties and chemical resistance, it has been and is used for a wide range of applications.

However, an ordinary polyester film is liable to cause generation and accumulation of static electricity because a polyester itself has high electrical insulating properties, thereby causing various troubles due to static electricity. For instance, a polyester film has been so far widely used as an OHP (Over Head Projector) film, but a conventional polyester film for use as an OHP film is insufficient in antistatic properties and hence, may cause such trouble that two or more films are carried while they are overlapped with each other by static electrostatic charge when they are used in a copier.

There have been, heretofore, known methods for improving antistatic properties such as one in which anionic compounds such as an organic sulfonic acid salt, a metal powder, carbon powder or the like is kneaded into a substrate film and one in which a metal compound is vapor deposited on a substrate film. However, these methods involve such problems as a deterioration in transparency and an increase in processing costs.

Further, there is known another known method for improving antistatic properties to form a coating film of a synthetic resin (binder) which contains an antistatic agent, on the surface of a substrate film in advance. In this case, an anionic compound or a cationic compound having good application properties is used as the antistatic agent. However, these materials are inferior in antistatic properties at a low humidity. Although this defect can be eliminated to some extent by using a large amount of the antistatic agent, a new problem occurs that films readily stick to each other (to be referred to as "blocking" hereinafter) at a high humidity due to the hydrophilic nature of the antistatic agent. Thus, it has been difficult for a conventional antistatic agent to achieve anti-blocking properties and antistatic properties at a low humidity at the same time.

JP-A 6-255055 (the term "JP-A" as used herein means an "unexamined published Japanese patent application") and JP-B 1-49114 (the term "JP-B" as used herein means an "Japanese Laid-open Patent Publication") teach that a phosphoric acid-based antistatic agent is excellent in antistatic properties even at a low humidity and exhibits excellent conductivity and antistatic properties even in an in-line coating method in which it is applied as a coating fluid to an unstretched or monoaxially stretched polyester film and the coated film is stretched and is subjected to heat-treatment. However, in this method, the application properties of the phosphoric acid-based antistatic agent are insufficient due to its poor wettability to a polyester film substrate and good coating appearance cannot be obtained without pretreatment such as corona discharge treatment of the film substrate. Therefore, the application of the antistatic agent has been limited.

Some of the inventors of the present invention have proposed in JP-A 7-156357 an antistatic film for photoengraving, which has formed on its one side or both sides a coating layer of a composition essentially comprising (A) 30 to 75% by weight of an aqueous polyester having a secondary transition point of 40 to 85° C., (B) 20 to 45% by weight of phosphoric acid ester salt-based antistatic agent and (C) 0 to 30% by weight of fine particles, and a production process thereof. This antistatic film for photoengraving has excellent antistatic properties and transparency and good humidity resistance. The above publication teaches that a surfactant can be added to the coating layer to improve the wettability of the film surface, and in its Examples, polyoxyethylene nonylphenylether was used as the surfactant. An antistatic film obtained in the Example in which this surfactant (having an HLB value of 14.2) was used was insufficient in the uniformity of a coating layer formed on the surface and the generation of fine coating spots was often observed.

SUMMARY OF THE INVENTION

The inventors of the present invention have conducted intensive studies to solve the above problems and have found that, when a specific surfactant and fine particles are combined with a phosphoric acid ester salt-based antistatic agent, the resulting mixture can be applied well as a coating fluid without a pretreatment such as corona discharge treatment, an uniform coating film can be formed, and a antistatic polyester film having excellent coating appearance, antistatic properties, anti-blocking properties and adhesion and being extremely useful can be produced at low costs. The present finding has led to the present invention.

According to the present invention, there is provided an antistatic polyester film having formed on one side or both sides thereof a coating layer having composition which essentially consists of:

(a) 5 to 40% by weight of a phosphoric acid ester salt-based antistatic agent;

(b) 1 to 20% by weight of a surfactant having an HLB value of 12 or less;

(c) 40 to 90% by weight of at least one binder selected from acrylic copolymers and polyester copolymers; and (d) 3 to 25% by weight of fine particles having an average particle diameter of 10 to 500 nm, the surface of the coating layer having such uniformity that the reduction rate of the glossiness of the coated polyester film surface having aluminum vapor deposited thereon is 5% or less, based on the glossiness of an uncoated polyester film surface having aluminum vapor deposited thereon when it is taken as 100%.

The present invention is described hereinafter in detail.

DETAILED DESCRIPTION OF THE INVENTION

The polyester for forming the polyester film in the present invention is a linear saturated polyester synthesized from an aromatic dibasic acid or its ester-forming derivative and a diol or its ester-forming derivative. Illustrative examples of the polyester include polyethylene terephthalate, polyethylene isophthalate, polybutylene terephthalate, poly(1,4-cyclohexylenedimethyleneterephthalate), polyethylene-2,6-naphthalene dicarboxylate and the like. Copolymers thereof and blends thereof which contain a small amount of other resin are also included. Among these, polyethylene terephthalate and polyethylene-2,6-naphthalene dicarboxylate are particularly preferred.

These polyesters may contain, as required, an inorganic lubricant-such as silicon oxide, aluminum oxide, magnesium oxide, calcium carbonate, kaolin, talc, titanium oxide or barium sulfate; an organic lubricant such as a crosslinked silicone resin, crosslinked polystyrene resin, crosslinked acrylic resin, urea resin or melamine resins; other resin such as polyethylene, polypropylene, ethylene-propylene copolymer or olefinic ionomer; and other additive such as an antioxidant, ultraviolet absorber or fluorescent brightener.

In the present invention, the polyester film is a biaxially oriented film, preferably a transparent biaxially oriented film. The thickness of the film is 5 to 500 μm, preferably 20 to 500 μm, the most preferably 50 to 300 μm. When the thickness is less than 5 μm, the film is fragile and hence, not suitable. When the thickness is more than 500 μm, the film forming property is liable to deteriorate.

In the present invention, the antistatic coating layer to be formed on one side or both sides of the polyester film has composition which essentially consists of the following components (a) to (d):

(a) 5 to 40% by weight of a phosphoric acid ester salt-based antistatic agent;

(b) 1 to 20% by weight of a surfactant having an HLB value of 12 or less;

(c) 40 to 90% by weight of at least one binder selected from acrylic copolymers and polyester copolymers; and (d) 3 to 25% by weight of fine particles having an average particle diameter of 10 to 500 nm.

The coating film having the above composition is formed on the surface of a polyester film substrate as an uniform film by preparing an aqueous coating having this composition, applying the coating onto the surface of the polyester film substrate, drying and stretching the coating film. The coating film formed on the surface of the polyester film substrate is made extremely uniform by using the aqueous coating having the above composition. When the degree of uniformity of the coating film is expressed by its glossiness obtained when aluminum is vapor deposited on the surface, a reduction in glossiness is 5% or less, preferably 4% or less.

That is, when aluminum is vapor deposited on a polyester film having no coating film and a polyester film having a coating film formed thereon and these polyester films are compared in accordance with a measurement method to be described hereinafter, the difference of glossiness between the two films is 5% or less. Therefore, it is understood that the polyester film of the present invention has an extremely uniform surface.

Conventionally known compounds can be used as the phosphoric acid ester salt-based antistatic agent (a) constituting the coating used in the present invention. Among the compounds, phosphoric acid ester salt-based low molecular weight compounds such as alkyl phosphate sodium salt, alkyl phosphate potassium salt, aryl phosphate sodium salt, aryl phosphate potassium salt, dialkyl phosphate sodium salt, dialkyl phosphate potassium salt, diaryl phosphate sodium salt, diaryl phosphate potassium salt, polyalkylene oxide phosphate sodium salt, polyalkylene oxide phosphate potassium salt, substituted phosphoric partial ester salt and the like are preferably used. They may be used alone or in combination of two or more.

These phosphoric acid ester salt-based antistatic agents (a) are used in the coating layer in a proportion of 5 to 40% by weight, preferably 10 to 30% by weight. If the proportion is more than 40% by weight, anti-blocking properties and adhesion will be insufficient and if the proportion is less than 5% by weight, an antistatic effect will be insufficient.

In the coating layer of the present invention, the surfactant (b) has an HLB value of 12 or less. The term "HLB" stands for Hydrophile-Lipophile Balance which indicates the balance between a lipophilic portion and hydrophilic portion contained in the molecule of a surfactant numerically and which has been proposed by Mr. Griffin of Atlas Co. The HLB value can be calculated from the following equation (I).

HLB=20 (1−Mo/M)

wherein Mo is a molecular weight of a hydrophobic group and M is a molecular weight of the surfactant.

In the present invention, the phosphoric acid ester salt-based antistatic agent (a) contained in the coating layer has such a defect that it readily forms a spotted coating film on the surface of a hydrophobic polyester film due to its high hydrophilic nature. However, when the above antistatic agent is used in combination with the above surfactant having a low HLB value, an uniform coating film can be formed because this hydrophilic nature seems to be alleviated. When a surfactant having an HLB value of more than 12 is used, its hydrophilic nature becomes strong and a spotted coating film is liable to be formed.

Illustrative examples of the surfactant having an HLB value of 12 or less include a block copolymer of polyethylene oxide and polypropylene oxide, polyoxyethylene alkyl ether, polyoxyethylene alkyl phenyl ether, polyoxyethylene monoalkylate, polyoxyethylene aliphatic acid ester, sorbitan aliphatic acid ester, glycerin aliphatic acid ester and the like. They may be combined with another surfactant having an HLB value of more than 12 in an amount that does not generate coating spots. The HLB value of the surfactant (b) is preferably in the range of 12 to 5, particularly preferably 11.5 to 8. The surfactant (b) is used in the coating layer in a proportion of 1 to 20% by weight, preferably 3 to 15% by weight. If the proportion is more than 20% by weight, anti-blocking properties will be insufficient and if the proportion is less than 1% by weight, the wettability of the coating will be insufficient, thereby making it difficult to form an uniform film.

An acrylic copolymer or a polyester copolymer is used as the binder (c) in the coating layer of the present invention. A mixture of these copolymers may be used. The coating layer of the present invention is formed by applying an aqueous coating prepared by dissolving or dispersing coating constituents (a) to (d) in an aqueous medium (typically water), to the surface of a film. Therefore, the copolymer of the binder component (c) preferably is soluble or readily dispersible in an aqueous medium.

A monomer component constituting the acrylic copolymer used as the binder (c) is exemplified by acrylic acid, methyl acrylate, ethyl acrylate, butyl acrylate, soda acrylate, ammonium acrylate, 2-hydroxyethyl acrylate, methacrylic acid, methyl methacrylate, ethyl methacrylate, butyl methacrylate, soda methacrylate, ammonium methacrylate, 2-hydroxyethyl methacrylate, glycidyl methacrylate, acrylamide, methacrylamide, N-methylolacrylamide, N-methylolmethacrylamide and the like. These monomers may be used in combination with other unsaturated monomers such as styrene, vinyl acetate, acrylonitrile, methacrylonitrile, vinyl chloride, vinylidene chloride and divinyl benzene. A block polymer or graft polymer obtained by modifying an acrylic copolymer with a polyester, polyurethane, silicone, epoxy or phenolic resin or the like may be used as the acrylic copolymer.

Among the above monomers constituting the acrylic copolymer, ethyl acrylate, methacrylic acid, methyl methacrylate, 2-hydroxyethyl methacrylate and N-methylolacrylamide are preferred.

The acrylic copolymer preferably has a secondary transition temperature (Tg) of 25 to 120° C., particularly preferably 40 to 85° C. This acrylic copolymer preferably has a molecular weight of about 100,000 to about 1,000,000, particularly preferably about 200,000 to about 800,000. When the secondary transition temperature (Tg) of the acrylic copolymer is less than 25° C., the anti-blocking properties of a coated film deteriorate and when Tg is more than 120° C., it is difficult to form an uniform coating film. When the molecular weight of the acrylic copolymer is smaller than about 100,000, it is difficult to form an uniform coating film and the film is fragile even if it is formed. When the molecular weight is more than about 1,000,000, it is not easy to coat a film.

An acid component forming the polyester copolymer as the binder component (c) is exemplified by terephthalic acid, 2,6-naphthalenedicarboxylic acid, isophthalic acid, phthalic acid, phthalic anhydride, 1,4-cyclohexanedicarboxylic acid, adipic acid, sebacic acid, phenylindanedicarboxylic acid, dimer acid and the like. These components may be used in combination of two or more. Among these acid components, terephthalic acid, 2,6-naphthalenedicarboxylic acid and isophthalic acid are preferred. Further, these components may be used in combination with a small amount of an unsaturated polybasic acid such as maleic acid, fumaric acid and itaconic acid; and hydroxycarboxylic acid such as p-hydroxybenzoic acid and p-(β-hydroxyethoxy)benzoic acid. The proportion of the unsaturated polybasic acid component or the hydroxycarboxylic acid component is 10 mol % at the most, preferably 5 mol % or less.

A polyol component forming the polyester copolymer is exemplified by ethylene glycol, 1,4-butane diol, neopentyl glycol, diethylene glycol, dipropylene glycol, 1,6-hexane diol, 1,4-cyclohexane dimethanol, xylylene glycol, dimethylolpropionic acid, glycerin, trimethylol propane, poly(ethyleneoxide)glycol, poly(tetramethyleneoxide)glycol, and adduct of bisphenol A and ethylene oxide and adduct of bisphenol A and propylene oxide, each represented by the following formulas:

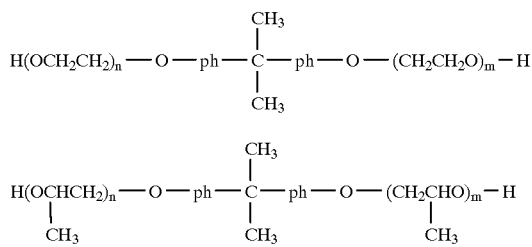

wherein n+m=2 to 10 and ph=phenylene group.

They may be used in combination of two or more.

Among these polyol components, ethylene glycol, adduct of bisphenol A and ethylene oxide, adduct of bisphenol A and propylene oxide and 1,4-butane diol are preferred, and ethylene glycol and adduct of bisphenol A and ethylene oxide and adduct of bisphenol A and propylene oxide are more preferred.

A trace amount of a compound having a sulfonic acid base or a compound having a carboxylic acid base is preferably copolymerized to facilitate water solubilization of the polyester copolymer.

Illustrative examples of the compound having a sulfonic acid base for facilitating water solubilization of the polyester copolymer include compounds containing alkali metal salts of sulfonic acid and amine salts of sulfonic acid such as 5-sodium sulfoisophthalic acid, 5-ammonium sulfoisophthalic acid, 4-sodium sulfoisophthalic acid, 4-methylammonium sulfoisophthalic acid, 2-sodium sulfoisophthalic acid, 5-potassium sulfoisophthalic acid, 4-potassium sulfoisophthalic acid, 2-potassium sulfoisophthalic acid and sodium sulfosuccinic acid.

Illustrative examples of the compound having a carboxylic acid base include trimellitic anhydride, trimellitic acid, piromellitic anhydride, pyromellitic acid, trimesic acid, cyclobutane tetracarboxylic acid, dimethylolpropionic acid and monoalkali metal salts thereof.

It is advantageous that these sulfonic acid base containing compounds and carboxylic acid base containing compounds are copolymerized in the polyester copolymer in a proportion of 2 to 30 mol %, preferably 5 to 20 mol %.

A modified polyester copolymer such as a block copolymer or graft copolymer prepared by modifying a polyester copolymer with an acrylic, polyurethane, silicone, epoxy or phenolic resin or the like may be used as the polyester copolymer.

The polyester copolymer or the acrylic copolymer of the binder (c) in the present invention is easily adhered to a toner for OHP, for example. From a viewpoint of this adhesion function, the polyester copolymer is more preferred than the acrylic copolymer.

The polyester copolymer preferably has a secondary transition temperature (Tg) of 25 to 120° C., particularly preferably 40 to 85° C. The polyester copolymer preferably has a molecular weight of about 3,000 to about 80,000, particularly preferably about 10,000 to about 50,000.

The binder (c) is used in the coating layer in a proportion of 40 to 90% by weight, preferably 50 to 80% by weight. When the proportion of the binder (c) is less than 40% by weight, the adhesion of the coating layer is insufficient, while when the proportion is more than 90% by weight, an antistatic effect is unsatisfactory disadvantageously.

The fine particles (d) in the coating layer of the present invention have an average particle diameter of 10 to 500 nm and may be inorganic or organic fine particles. Illustrative examples of the inorganic fine particles include fine particles of calcium carbonate, calcium oxide, aluminum oxide, kaolin, silicon oxide and zinc oxide, and those of the organic fine particles include fine particles of a crosslinked acrylic resin, crosslinked polystyrene resin, melamine resin, fluororesin, crosslinked silicone resin and polyolefin. The particle diameter of the fine particles is 10 to 500 nm, preferably 20 to 300 nm. When the particle diameter is less than 10 nm, anti-blocking properties is liable to deteriorate, while the particle diameter is more than 500 nm, transparency is liable to lower.

The fine particles (d) are used in the coating layer in a proportion of 3 to 25% by weight, preferably 5 to 20% by weight. When the proportion is more than 25% by weight, the transparency of the resulting film lowers, while when the proportion is less than 3% by weight, the anti-blocking properties of the resulting film deteriorate disadvantageously.

In the present invention, the antistatic coating film on the surface of the polyester film is formed by applying an aqueous coating having composition comprising (a) to (d) above to a film substrate. Although water is substantially used in the aqueous coating as a medium, a water-soluble organic solvent may be contained in the coating, in addition to water. Illustrative examples of the water-soluble organic solvent include methyl ethyl ketone, acetone, ethyl acetate, tetrahydrofuran, dioxane, cyclohexanone, n-hexane, toluene, xylene, methanol, ethanol, n-propanol, isopropanol and the like. They may be used alone or in combination of two or more.

The coating may contain other additive such as an ultraviolet absorber, pigment, anti-foaming agent, coating improving agent, lubricant, anti-blocking agent, melamine-based crosslinking agent, urea-based crosslinking agent, guanamine-based crosslinking agent, epoxy-based crosslinking agent, aziridine-based crosslinking agent or block isocyanate-based crosslinking agent, coupling agent or the like.

The solid content concentration of the aqueous coating in the present invention is generally 30% by weight or less, preferably 20% by weight or less. This solid content concentration is preferably 0.4% by weight or more.

The term "solid content" as used herein denotes components other than the solvent and is substantially the total amount of the components (a) to (d).

In the present invention, the coating comprising the components (a) to (d) is applied to at least one side of the polyester film substrate which is a polyester film whose crystalline orientation has not been completed yet.

The polyester film substrate whose crystalline orientation has not been completed yet is exemplified by an unoriented film prepared by melt-extruding a polyester and forming the resulting polyester into a form of film, a monoaxially oriented film prepared by stretching an unoriented film in a longitudinal or transverse direction, and a biaxially oriented film prepared by stretching in both longitudinal and transverse directions at low draw ratios (a biaxially oriented film which is not re-oriented in a longitudinal or transverse direction to complete its crystalline orientation). Among these, a monoaxially oriented film which is stretched in a longitudinal direction is preferred.

Any known application method can be employed as the method for applying the coating to the polyester film substrate. For example, a roll coating, gravure coating, microgravure coating, reverse coating, roll brushing, spray coating, air knife coating, impregnation and curtain coating may be employed alone or in combination. The aqueous coating may contain a trace amount of the organic solvent to promote the stability of the coating and the application properties of the coating.

The amount of coating is preferably 0.5 to 50 g, more preferably 5 to 30 g per $m^2$ of the traveling film. The thickness of the final dried coating film needs to be 0.01 to 1 $\mu$m, preferably 0.02 to 0.6 $\mu$m. When the thickness of the coating film is less than 0.01 $\mu$m, sufficient antistatic properties cannot be obtained. When the thickness is more than 1 $\mu$m, anti-blocking properties deteriorates disadvantageously.

Coating may be carried out on one side only or both sides of the film according to the application of the film. After coating, drying is carried out to obtain an uniform coating film.

In the present invention, after the coating is applied to the polyester film substrate, the resulting film is dried and oriented. This drying is preferably carried out at 90 to 130° C. for 2 to 20 seconds. This drying can also function as a preheat treatment for orientation or a heat treatment at the time of orientation.

The polyester film is drawn at a temperature of 70 to 140° C. to 2.5 to 7 times in a longitudinal direction and to 2.5 to 7 times in a transverse direction with an area magnification of 8 times or more, preferably 9 to 28 times. When the film is re-oriented, it is preferably drawn to 1.05 to 3 times (with the same area magnification). A thermal setting treatment after orientation is preferably carried out at a temperature higher than the final orientation temperature and lower than a melting point for 1 to 30 seconds. For example, a polyethylene terephthalate film is preferably thermally set at 170 to 240° C. for 2 to 30 seconds.

The thus obtained antistatic polyester film has a light transmittance of 90% or more and a surface resistivity (at a temperature of 23° C. and a humidity of 35%) of $1 \times 10^{12}$ $\Omega \cdot \text{square}^{-1}$ or less, preferably $1 \times 10^{10}$ to $1 \times 10^{11}$ $\Omega \cdot \text{square}^{-1}$, is excellent in coating appearance, transparency, adhesion, humidity resistance at a high humidity and antistatic properties at a low humidity, has an extremely uniform coating film, and is advantageously usable as a film for magnetic tape, display, OHP, printing, photoengraving, packaging and the like. Particularly, it is extremely useful as a film for OHP or photoengraving.

EXAMPLES

The following examples are given to further illustrate the present invention. Characteristic properties in the examples are obtained by the following methods.

1. coating appearance of coated film

The coating appearance of a coated film is evaluated visually. A coating surface which is uniform without defect is evaluated as ○ and a coating surface having spots or marble-like defects is evaluated as X.

2. light transmittance (transparency)

Measured in accordance with ASTM D1003 using the Model HR-100 haze meter of Murakami Color Research Laboratory Co. Ltd.

3. friction coefficient (slipperiness)

A static coefficient of friction ($\mu s$) is measured using the slipperiness measuring instrument of Toyo Tester Industry Co. Ltd., in accordance with ASTM D1894-63 by putting a front surface of a film and a rear surface of another film together and applying a load of 1 kg.

4 anti-blocking properties (humidity resistance)

Peel strength (g/50 mm) is measured at a portion which is applied a load by a tensile tester after the front and rear surfaces of a 50 mm-wide sample film are put together and treated for 17 hours under a load of 50 kg/cm² at 60° C. and 80% RH. Anti-blocking properties is evaluated as follows from the value of peel strength.

good anti-blocking properties: peel strength≦10 fair anti-blocking properties: 10<peel strength≦30 poor anti-blocking properties: 30<peel strength 5 toner adhesion (adhesion)

Data is printed on a coated film using a copier (Model Vivace 500) of Fuji Xerox Co. Ltd. to observe and evaluate the adhesion of toner.

6. surface resistivity (antistatic properties)

The surface resistivity ($\Omega \cdot \text{square}^{-1}$) of a sample film is measured using a resistivity measuring instrument of Takeda Riken Industry Co. Ltd. at a temperature of 23° C. at a humidity of 35% 1 minute after a voltage of 500 V is applied. The surface resistivity is preferably $1 \times 10^{11}$ $\Omega \cdot \text{square}^{-1}$ or less.

7. uniformity of coating film (reduction rate of glossiness)

Aluminum is vapor deposited on the surface of a coated film (the thickness of aluminum deposited is 700Å) and the glossiness of the resulting film surface is measured at 85° C. using the Multi-Gloss 268 glossimeter of Minolta Co. Ltd. Separately, aluminum is vapor deposited on the surface of an uncoated film and the glossiness of the resulting film surfaces is measured under the same conditions. When the glossiness of the uncoated film surface is taken as 100%, a relative value of glossiness of the coated film surface is obtained. A relative glossiness value of more than 95% is equivalent to a reduction rate of 5% or less.

To vapor deposit aluminum on the surface of an uncoated film, the uncoated film is oriented under the same conditions as those of a coated film and then, aluminum is vapor deposited on the surface of the uncoated film under the same conditions as those of the coated film. The glossiness of the uncoated film surface is measured and taken as 100%. As a simple method which is only applied to a film coated on one side, aluminum is vapor deposited on a surface opposite to the coated surface of the film, the glossiness of the uncoated surface is measured and taken as 100% to obtain a relative value.

Example 1

A copolyester (Tg=77° C.) having an intrinsic viscosity of 0.51 which was prepared from terephthalic acid, isophthalic acid, 5-sodium sulfoisophthalic acid, ethylene glycol and adduct of bisphenol A and ethylene oxide represented by the following structural formula was dispersed in an aqueous medium to prepare an aqueous dispersion having a solid content concentration of 5% as an aqueous solution A.

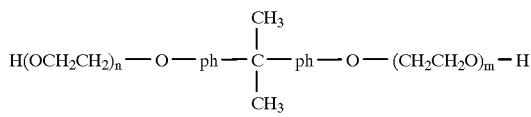

wherein n+m=4 and ph=1,4-phenylene group.

Separately, a polyester (intrinsic viscosity: 0.65) prepared from terephthalic acid and ethylene glycol was melt-extruded over a rotary cooling drum which was maintained at 20° C. to produce an unoriented film. Then the unoriented film was drawn to 3.6 times in a machine direction and an aqueous coating prepared by mixing 60% by weight of the above aqueous solution A, 20% by weight of an aqueous solution (concentration: 5% by weight) of dipentyl phosphate sodium salt as an antistatic agent, 10% by weight of an aqueous solution (concentration: 5% by weight) of polyoxyethylene nonylether (HLB: 11.3) as a surfactant and 10% by weight of an aqueous dispersion (concentration: 5% by weight) of crosslinked acrylic resin particles (particle diameter: 60 nm) was applied to both sides of the film in an amount of 5 g/m$^2$ (wet) by a kiss-roll coating method. Subsequently, the film was drawn to 3.9 times in a transverse direction to produce a 100 μm-thick coated biaxially oriented polyester film.

The coating appearance, light transmittance, friction coefficient, anti-blocking properties, toner adhesion and surface resistivity of this film are shown in Table 1.

Example 2

An acrylic copolymer (number average molecular weight: 263,000) prepared from methyl methacrylate, ethyl acrylate, 2-hydroxyethyl methacrylate and N-methylolmethacrylamide was dispersed in an aqueous medium to prepare an aqueous dispersion having a solid content concentration of 5% as an aqueous solution B.

A coated biaxially oriented polyester film was obtained in the same manner as in Example 1 except that the aqueous solution A used in Example 1 was changed to the above aqueous solution B.

The coating appearance, light transmittance, friction coefficient, anti-blocking properties, toner adhesion and surface resistivity of this film are shown in Table 1.

Example 3

A coated biaxially oriented polyester film was obtained in the same manner as in Example 1 except that the surfactant used in Example 1 was changed to polyoxyethylene nonylphenyl ether (HLB: 10.7).

The coating appearance, light transmittance, friction coefficient, anti-blocking properties, toner adhesion and surface resistivity of this film are shown in Table 1.

Example 4

A coated biaxially oriented polyester film was obtained in the same manner as in Example 1 except that the aqueous coating used in Example 1 was changed to an aqueous coating prepared by mixing 35% by weight of the aqueous solution A, 30% by weight of the aqueous solution B, 20% by weight of an aqueous solution (concentration of 5% by weight) of dioctyl phosphate potassium salt as an antistatic agent, 10% by weight of an aqueous solution (concentration: 5% by weight) of polyoxyethylene nonylphenyl ether (HLB: 10.8) as a surfactant and 5% by weight of an aqueous dispersion (concentration: 5% by weight) of crosslinked polystyrene resin particles (particle diameter: 120 nm).

The coating appearance, light transmittance, friction coefficient, anti-blocking properties, toner adhesion and surface resistivity of this film are shown in Table 1.

Comparative Example 1

A coated biaxially oriented polyester film was obtained in the same manner as in Example 1 except that the surfactant used in Example 1 was changed to polyoxyethylene nonylphenyl ether (HLB: 14.2).

The coating appearance, light transmittance, friction coefficient, anti-blocking properties, toner adhesion and surface resistivity of this film are shown in Table 1.

Comparative Example 2

A coated biaxially oriented polyester film was obtained in the same manner as in Example 1 except that the coating composition used in Example 1 was changed to a coating composition consisting of 30% by weight of the aqueous solution A, 50% by weight of an aqueous solution (concentration of 5% by weight) of dipentyl phosphate potassium salt as an antistatic agent, 10% by weight of an aqueous solution (concentration: 5% by weight) of polyoxyethylene nonylphenyl ether (HLB: 10.7) as a surfactant and 10% by weight of an aqueous dispersion (concentration: 5% by weight) of crosslinked acrylic resin particles (particle diameter: 60 nm).

The coating appearance, light transmittance, friction coefficient, anti-blocking properties, toner adhesion and surface resistivity of this film are shown in Table 1.

Comparative Example 3

A coated biaxially oriented polyester film was obtained in the same manner as in Example 1 except that the coating composition used in Example 1 was changed to a coating composition consisting of 70% by weight of the aqueous solution A, 20% by weight of an aqueous solution (concentration of 5% by weight) of dipentyl phosphate potassium salt as an antistatic agent and 10% by weight of an aqueous solution (concentration: 5% by weight) of polyoxyethylene nonylphenyl ether (HLB: 10.7) as a surfactant.

The coating appearance, light transmittance, friction coefficient, anti-blocking properties, toner adhesion and surface resistivity of this film are shown in Table 1.

Comparative Example 4

A coated biaxially oriented polyester film was obtained in the same manner as in Example 1 except that the antistatic agent used in Example 1 was changed to dodecyl soda sulfonate.

The coating appearance, light transmittance, friction coefficient, anti-blocking properties, toner adhesion and surface resistivity of this film are shown in Table 1.

Comparative Example 5

The light transmittance, friction coefficient, anti-blocking properties, toner adhesion and surface resistivity of a film obtained without application of a coating in Example 1 are shown in Table 1.

TABLE 1

|  | Coating appearance | reduction rate of glossiness of coated surface (%) | light transmittance (transparency) | friction coefficient (slipperiness) | anti-blocking properties (humidity resistance) | toner adhesion | surface resistivity (antistatic properties) ($\Omega \cdot \text{square}^{-1}$) |
|---|---|---|---|---|---|---|---|
| Example No. 1 | ◯ | 3.1 | 93 | 0.42 | good | good | $5 \times 10^{10}$ |
| Example No. 2 | ◯ | 4.0 | 91 | 0.39 | good | good | $7 \times 10^{10}$ |
| Example No. 3 | ◯ | 3.4 | 93 | 0.43 | good | good | $5 \times 10^{10}$ |
| Example No. 4 | ◯ | 4.2 | 90 | 0.40 | good | good | $6 \times 10^{10}$ |
| Comp. Ex. No. 1 | X | 7.5 | 90 | 0.41 | fair | good | $5 \times 10^{10}$ |
| Comp. Ex. No. 2 | ◯ | 3.8 | 92 | 0.42 | poor | poor | $1 \times 10^{10}$ |
| Comp. Ex. No. 3 | ◯ | 3.0 | 94 | 0.60 | poor | good | $6 \times 10^{10}$ |
| Comp. Ex. No. 4 | ◯ | 3.4 | 92 | 0.42 | fair | poor | $>10^{13}$ |
| Comp. Ex. No. 5 | — | 0.0 | 94 | 0.62 | good | poor | $>10^{13}$ |

EFFECT OF THE INVENTION

Since an antistatic coating film having specific composition is formed on at least one side of a polyester film in the present invention, it is possible to provide an antistatic polyester film, particularly for use as an OHP or photoengraving film, having excellent uniform coating appearance, anti-blocking properties at a high humidity and antistatic properties at a low humidity.

What is claimed is:

1. An antistatic polyester film having formed on one side or both sides thereof a coating layer having composition which consists essentially of:

(a) 5 to 40% by weight of a phosphoric acid ester salt antistatic agent;

(b) 1 to 20% by weight of a surfactant having an HLB value of 12 or less;

(c) 40 to 90% by weight of at least one binder selected from acrylic copolymers and polyester copolymers; and (d) 3 to 25% by weight of fine particles having an average particle diameter of 10 to 500 nm, the surface of the coating layer having such uniformity that the reduction rate of the glossiness of the coated polyester film surface having aluminum vapor deposited thereon is 5% or less, based on the glossiness of an uncoated polyester film surface having aluminum vapor deposited thereon when it is taken as 100%.

2. An antistatic polyester film according to claim 1, wherein the amount of the phosphoric acid ester salt antistatic agent (a) in the coating layer is 10 to 30% by weight.

3. An antistatic polyester film according to claim 1, wherein the amount of the surfactant (b) in the coating layer is 3 to 15% by weight.

4. An antistatic polyester film according to claim 1, wherein the amount of the binder (c) in the coating layer is 50 to 80% by weight.

5. An antistatic polyester film according to claim 1, wherein the amount of the fine particles (d) in the coating layer is 5 to 20% by weight.

6. An antistatic polyester film according to claim 1, wherein the HLB value of the surfactant (b) is in the range of 5 to 12.

7. An antistatic polyester film according to claim 1, wherein the binder (c) is a polyester copolymer.

8. An antistatic polyester film according to claim 1, wherein the thickness of the coating layer is 0.01 to 1 $\mu$m.

9. An antistatic polyester film according to claim 1 which has a light transmittance of 90% or more.

10. A film for an overhead projector or photoengraving which is formed from the antistatic polyester film of claim 1.

11. A method for producing the antistatic polyester film of claim 1 comprising the steps of:

applying an aqueous coating containing a composition which consists essentially of:

(a) 5 to 40% by weight of a phosphoric acid ester salt-based antistatic agent;

(b) 1 to 20% by weight of a surfactant having an HLB value of 12 or less;

(c) 40 to 90% by weight of at least one binder selected from acrylic copolymers and polyester copolymers; and (d) 3 to 25% by weight of fine particles having an average particle diameter of 10 to 500 nm, onto one side or both sides of a polyester film substrate;

drying the resulting film; and drawing the dried film.

* * * * *